2 Sheets. Sheet 1.

L. H. Baker,

Sofa Bedstead.

No. 3,150. Reissued Oct. 6, 1868.

Witnesses.

H. C. Ashkenter
Wm. A. Morgan.

Inventor.

L. H. Baker
per Munn & Co.
attorneys.

2 Sheets. Sheet 2.

L. H. Baker,

Sofa Bedstead.

No. 3150. Reissued Oct. 6, 1868.

Witnesses.

Wm. A. Morgan.
G. C. Cotton.

Inventor.

L. H. Baker
per Munn & Co
Attorneys

THE ECKERT LITHOGRAPHING CO., WASHINGTON, D. C.

UNITED STATES PATENT OFFICE.

LEWIS H. BAKER, OF TARRYTOWN, NEW YORK.

IMPROVED CONVERTIBLE LOUNGE.

Specification forming part of Letters Patent No. 79,050, dated June 23, 1868; Reissue No. 3,150, dated October 6, 1868.

*To all whom it may concern:*

Be it known that I, LEWIS H. BAKER, of Tarrytown, in the county of Westchester and State of New York, have invented a new and useful Improvement in Convertible Lounges; and I do hereby declare that the following is a full, clear, and exact description thereof, which will enable others skilled in the art to make and use the same, reference being had to the accompanying drawings, forming part of this specification, in which—

Figure 1:
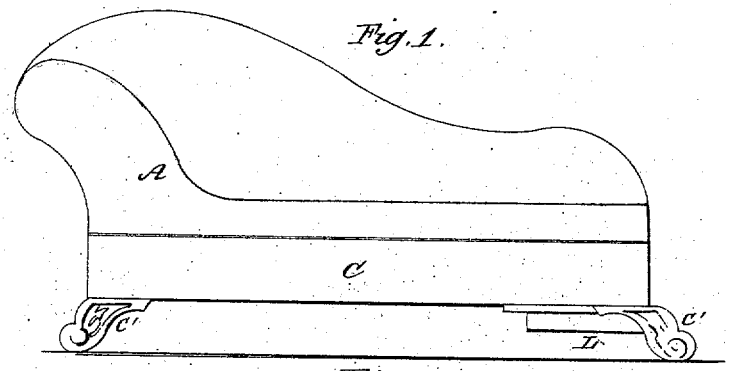
Figure 2:
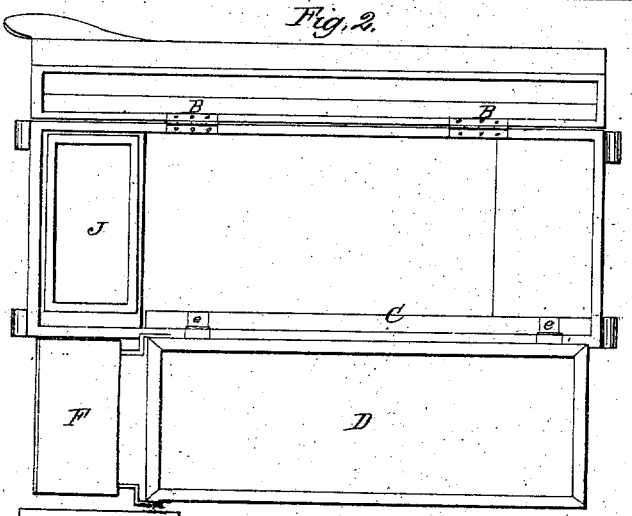
Figure 3:
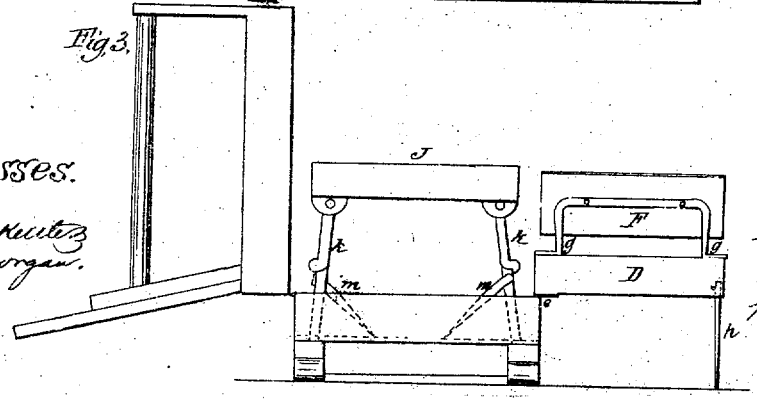
Figure 1:
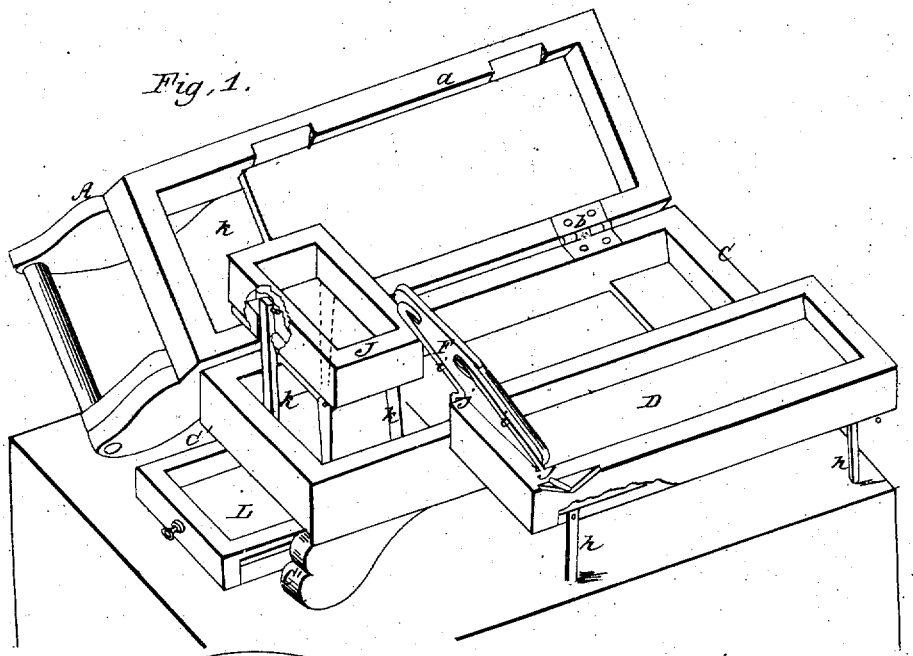
Figure 5:
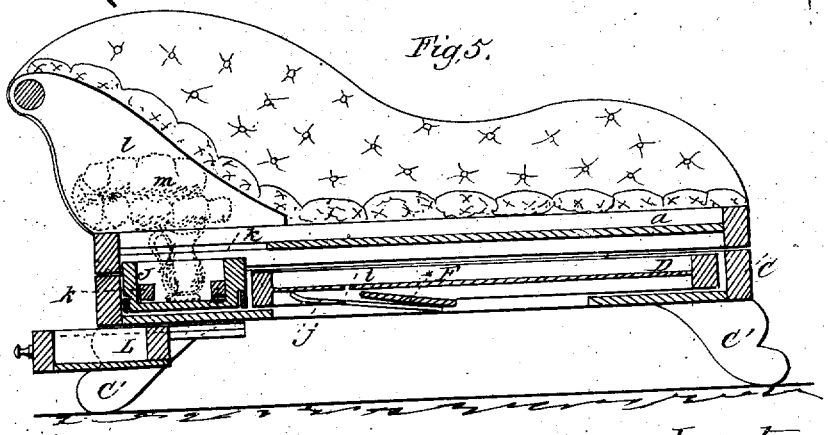

Figure 1, Sheet I, is a front view of my invention in a folded state or adjusted for use as a lounge or sofa. Fig. 2 is a plan or top view of the same in an unfolded state and adjusted as a double bed. Fig. 3 is a view of the head end of the lounge in an unfolded state with the wash-stand adjusted for use. Fig. 4, Sheet II, is a perspective view of my invention in an unfolded state and divested of upholstery. Fig. 5 is a front sectional view of the same in a folded state.

Similar letters of reference indicate like parts.

This invention relates to a new and improved construction of lounges and sofas, whereby they are made to serve various purposes and are made much more convenient as an article of household furniture than the ordinary kind; and it consists in so constructing the lounge and combining the several parts of which it is composed that provision is made for forming a double bed, with spaces for containing the bed-clothing and pillows when the device is not used as a bed, a proper head-rest retained for the extended or unfolded part of the device, and an adjustable wash-stand.

The body of the lounge is composed of two longitudinal parts, A C, part A having the back attached to a part, *a*, which comprises the seat portion of the lounge. The part C comprises the lower or base portion of the lounge, and is provided with feet C′. The part A is connected to the rear edge of part C by hinges *b*, so that part A may be turned over or unfolded backward from part C, as shown in Figs. 2 and 4. To the front edge of the base C a rectangular section or part, D, is attached by hinges *c*, said part D being folded over within part C when the device is used as a lounge, and unfolded or turned over out from part C when the device is used as a double bed, (see Figs. 2 and 4,) the part D being supported in this adjustment by pivoted legs *h*. (See more particularly Fig. 4.)

When the device is used as a double bed, the part A, after the part D has been turned over and out from part C, is turned down upon part C, the upholstery of the seat portion *a* serving as a mattress for one part, while the part D may be provided with a separate or independent mattress. This part D is provided with a head-rest, F, which is composed of a board attached to two rods, *i i*, which are attached to part D in such a manner that they may turn therein and admit of rest F being folded over on D, as shown in Fig. 5, and also folded outward from part D when required for use, as shown in Fig. 4, the rods *i* being curved or bent to form shoulders *j* to rest on the upper surface of part D and support F in a proper inclined position. (See Fig. 4.)

In the head end of the part *a* of the seat there is made an opening, *k*, which forms the entrance to a receptacle, *l*, in which a pillow or pillows are placed when not required for use, as shown in Fig. 5. It will be understood, of course, that the upholstery of the part A forms the top and sides of the receptacle *l*.

J represents the wash-stand, which is provided with jointed legs *k*, having braces *m* attached for the purpose of steadying the wash-stand when it is raised, as shown in Figs. 3 and 4. When let down or lowered, the top of the wash-stand is flush with the top of the base C, and the wash-bowl and pitcher are retained in position by the pillow *m′* in the receptacle *l*.

L represents a drawer, which is fitted in the base C underneath the wash-stand, and is designed to receive necessary toilet articles.

The bed-clothing when not in use is contained in the space between D and *a*, which space is shown clearly in Fig. 5.

Having thus described my invention, I claim as new and desire to secure by Letters Patent—

1. The combination, with a bedstead lounge, of an extension or folding wash-stand, constructed and arranged substantially as shown and described.

2. The forming of a receptacle, *l*, in the part

A of the lounge, with an opening, *k*, in the seat portion *a*, for the purpose of stowing pillows when the device is not in use as a bedstead, substantially as shown and described.

3. The hinged part D, depressed, and the seat part A, having its seat *a* raised, whereby a space is left between said parts for the reception of bed-clothing, as herein shown and described.

4. The drawer L and wash-stand J, arranged with relation to a lounge as described, all constructed substantially as and for the purpose specified.

LEWIS H. BAKER.

Witnesses:
FRANK BLOCKLEY,
ALEX. F. ROBERTS.